Sept. 20, 1966  W. VOM DORP  3,273,693
TRANSFER APPARATUS
Filed Sept. 20, 1963  3 Sheets-Sheet 2

Inventor
Walter vom Dorp
By his attorneys
Howson and Howson

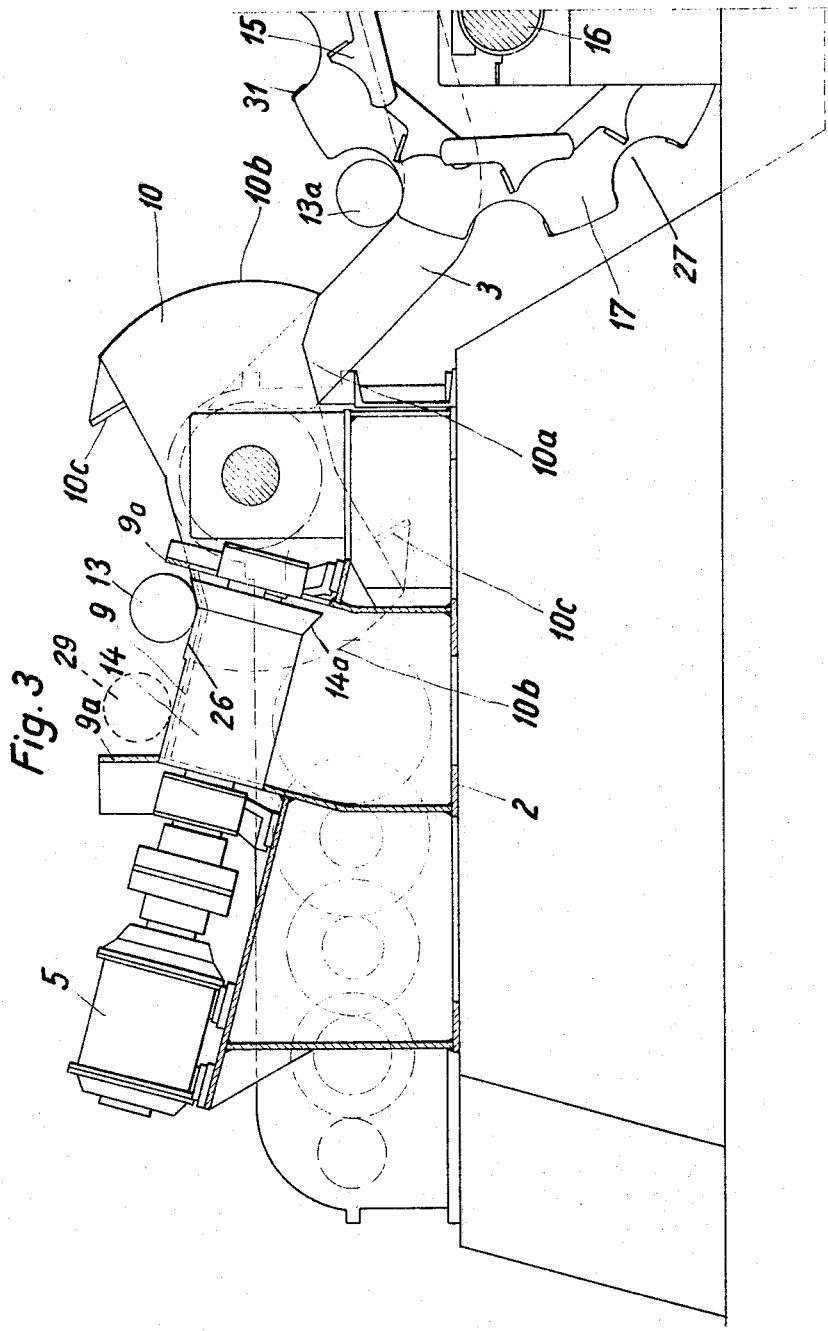

United States Patent Office 3,273,693
Patented Sept. 20, 1966

3,273,693
TRANSFER APPARATUS
Walter vom Dorp, Rheydt, Germany, assignor to Mannesmann-Meer Aktiengesellschaft, Dusseldorf, Germany, a German company
Filed Sept. 20, 1963, Ser. No. 310,293
9 Claims. (Cl. 198—127)

This invention concerns transfer apparatus and more particularly such apparatus when used for transferring elongated rolled mill stock to cooling beds. According to the invention, after mill stock of this nature has been processed through the last stand of a rolling mill and severed into lengths, it is moved onto a delivery roller conveyor, from which it is transferred by means of ejectors or lifters, to a cooling bed.

Generally increased speeds of production of rolled mill stock from rolling mills make it difficult to design the mill stock transport and transfer mechanisms so that the rolled mill stock will arrive uninjured on a cooling bed.

The purpose of the invention, therefore, is to effect, by simple means, continuous transportation of rolled mill stock emerging at high speed from a rolling mill, and to provide a damage free transfer of it to a cooling bed.

I have developed an improved apparatus for effecting the aforesaid damage free transfer of mill stock. As such stock is moved on a sloping supply roller conveyor toward a delivery roller conveyor having a matching sloping surface it is deviated laterally and traverses slantingly upward, thus arriving at the top of the delivery roller conveyor. Because of its own weight the mill stock thereafter rolls down the slope of the delivery conveyor until it is brought to a standstill. At the same time it is being conveyed longitudinally along the delivery roller conveyor. The mill stock is then guided out of that position with a rolling motion, to a cooling bed, while turning on its own axis. It is of particular significance that during the initial phase of rolling motion (i.e., down the slope of the delivery roller conveyor) the mill stock is not lifted, or at least that it is lifted but an immaterial amount, by the lifters employed for transferring it to a cooling bed. In other words, it is conveyed onward initially in a substantially uniform plane.

The apparatus for carryng this out consists in part of deflecting levers disposed in the region of the supply roller conveyor, which levers are pivotable by means of known, pneumatic, hydraulic, or mechanical elements. These levers deflect the mill stock laterally as it comes from the rolling mill, completing deflection of a given piece of stock as it reaches the delivery roller conveyor. The mechanism of the invention further consists of an inclined surface or run-on channel having gaps in which are disposed the drive rollers of the delivery roller conveyor, and of rotatable lifters or ejectors at the lower side of the delivery roller conveyor for effecting the transfer of rolled mill stock from the delivery roller conveyor to a cooling bed.

Further details of the invention will become evident from the drawings. In those drawings:

FIG. 3 is a vertical view in section through the apparatus of FIG. 1 along the line I—I of that figure looking in the direction of the arrows in that figure.

FIG. 4 is an enlarged view in elevation of the tapered end of a lifter and shows the lifter roll-along end stops.

FIG. 5 is an enlarged end view in plan of the tapered end of a lifter, showing novel design features.

FIG. 6 is a somewhat enlarged plan view of the tapered end of a lifter, similar to the view of FIG. 5 but rotated 90° to show one of the solid convex edges of the lifter.

Figure 1:
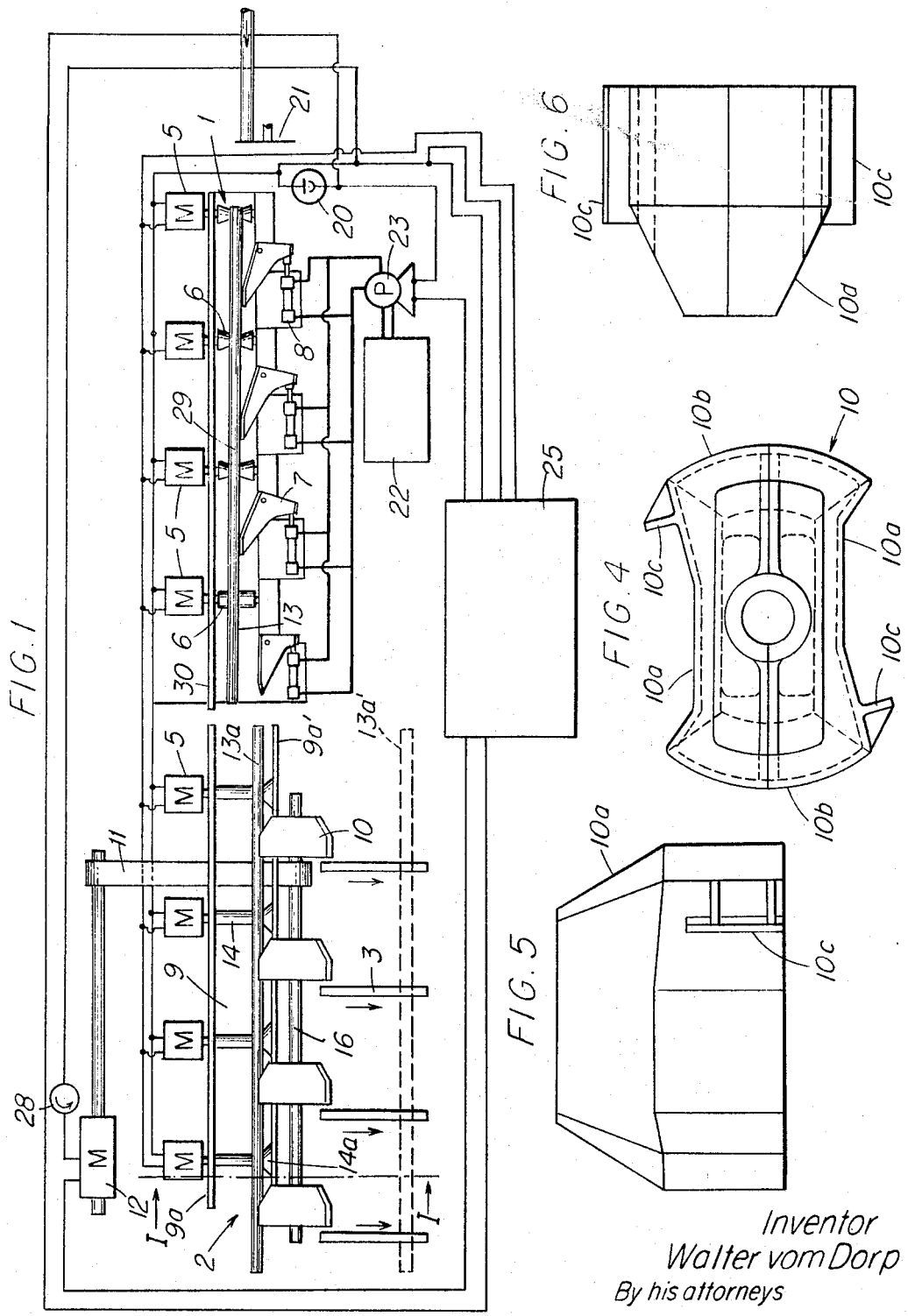
FIG. 1 is a diagrammatic view in plan of the supply roller conveyor and the delivery roller conveyor according to the invention showing the mill stock deflector levers, and the lifters. This figure also illustrates the controls and circuits that power the conveyors and the lifters.
Figure 2:
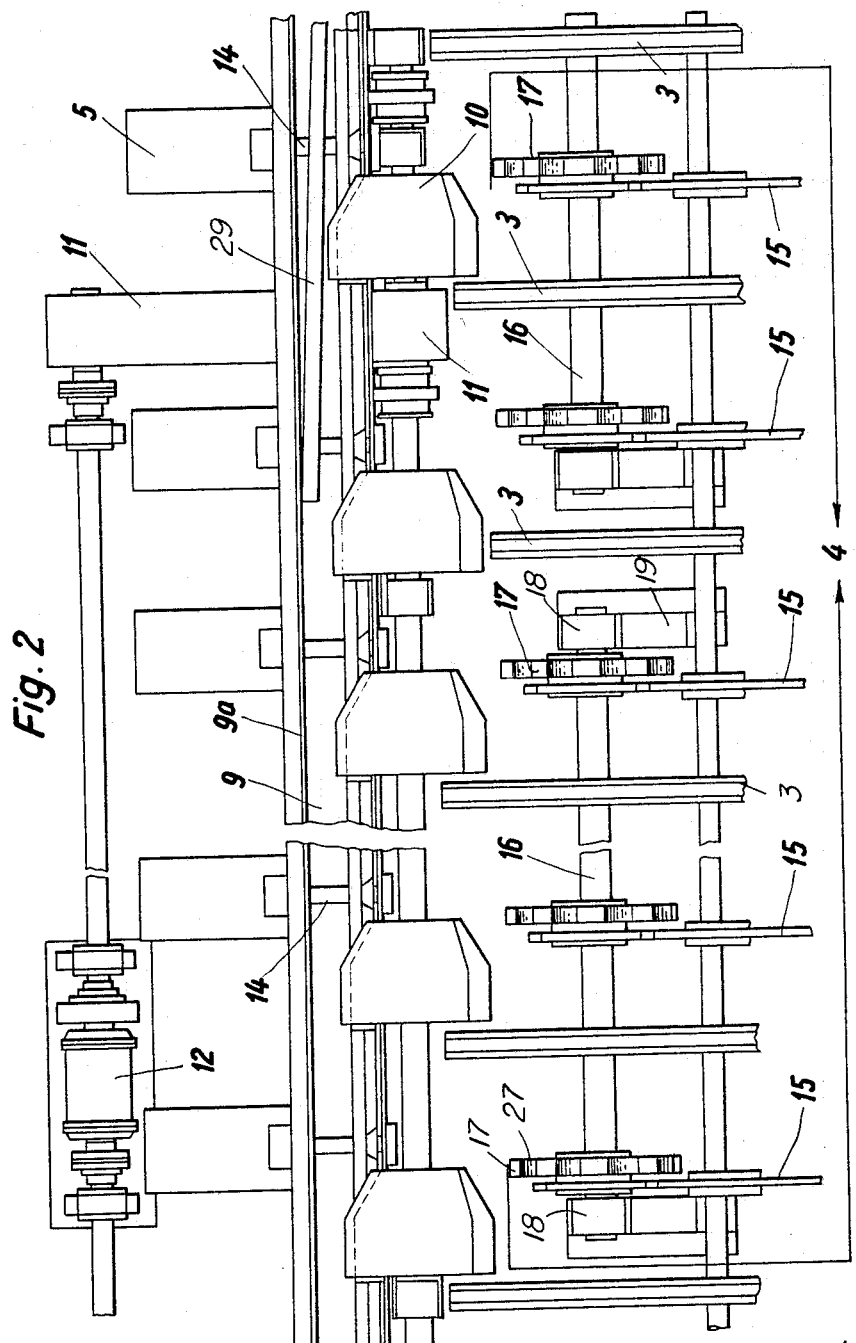
FIG. 2 is an enlarged view in plan of the delivery roller conveyor of FIG. 1 and cooling bed mechanism therewith associated.

Referring to the particular embodiment of the drawings as shown in FIGS. 1 and 2 there is a rolled mill stock cutter 21, a supply roller conveyor shown generally by 1, and a delivery roller conveyor shown generally by 2 which latter conveyor is connected by way of discharge skids 3 to a cooling bed indicated generally by 4. FIG. 2 shows brackets surrounding numeral 4 and the various devices of the cooling bed, discussed below. Rollers 6 of the supply roller conveyor are designed with non-uniform profiles. That is to say, the rollers describe essentially conical profiles at their center. The roller profiles gradually assume the shape of cylinders as viewed in section looking toward roller drive motors 5 and the supply roller conveyor guideway 30 adjacent thereto. One or more of the rollers 6 toward the output end of conveyor 1 may be substantially cylindrical (cf. FIGURE 1). Along the length of the supply roller conveyor are deflecting levers 7 which can be pivoted laterally through a predetermined angular range. These levers may be actuated, for example, by means of fluid cylinders 8, hydraulic fluid source 22, and hydraulic pump 23.

Delivery roller conveyor 2 has a surface or run-on channel 9 which slopes laterally and gradually upward (viewed in elevated end section as in FIGURE 3) to a predetermined height. There is a guideway or sideboard 9a at the upper edge of the channel 9. The supply roller conveyor 1 inclines so as to match the slope of the delivery roller conveyor 2. Lifters 10 on the said delivery roller conveyor 2 are driven by one or more lifter drive motors 12 through a transmission 11.

Rollers 14 of the delivery roller conveyor are driven by individual roller conveyor motors 5. These rollers have their longitudinal axes disposed in position to correspond with the slope of the channel 9. The rollers serve to transport mill stock longitudinally and simultaneously enable gravitational force to roll it down toward the lifters 10. Lifter run-on slants 10d (the tapered ends of the lifters) assist in guiding mill stock onto the lifters. At the lower end of each roller 14 there is a run-on cone 14a. The cooling bed 4 is provided with transport chains 15 driven by shaft 16 through motors 18 and transmissions 19. Notched catch or pick-up wheels 17 are coordinated with the shaft 16. It will be noted that while each length is being conveyed to the cooling bed it is turning about its own axis.

One of the lifter elements 10 is shown in end elevation in FIG. 4. It will be noted that it has two convex surfaces 10b (see FIGS. 3 and 4). These curvilinear surfaces 10b of the lifters 10, cooperatively with guideboard 9a (cf. FIGURE 3), serve to keep each length of product being transferred clear of the preceding length which is being lifted or ejected so that the second length will in turn be able to move onto the lifters along any empty set of roll-along surfaces 10a and gradually roll up against lifter roll-along end stops 10c as rotation of the lifters 10 continues. It will be seen from FIG. 2 that the tapered shape of the lifters 10 requires such separation as each convex or curvilinear surface 10b comes above the level of the channel 9 of the delivery roller conveyor.

A source of electrical energy, represented generally by the numeral 25, is utilized to energize the entire transport and transfer apparatus. The deflecting levers of the delivery conveyor are so connected to this source as to operate in unison. This is the preferred embodiment. Other arrangements are possible, such, for example, as having the levers deflect out individually, in successive order. In the preferred embodiment a photo-electric cell or light barrier 20 is wired to the energy source 25 and the hydraulic pump 23 in such manner, and so positioned in advance of or on the mill side of the first deflecting lever, that when a gap between two successive lengths of mill stock passes the barrier the hydraulic pump to the levers is energized.

An electrical energy circuit connects the energy source 25 to the lifter drive motor 12. The cooling bed drive motors and transmissions are powered by the energy source 25. The deflecting levers 7 and the two sets of motors 5 driving the supply and delivery conveyor rollers are also energized by the energy source 25. It will be recognized that if desired a three-wire supply system could be used, but to achieve simplicity I have not illustrated it in the drawings. The principles of the present invention are clearly shown in the drawings as they stand.

An important feature of the invention provides that various elements of the transfer apparatus operate in successive relation to each other. They operate periodically, in such a way that any given length of mill stock is transported and transferred continuously, with very brief pauses which ensure that it does not pick up substantial momentum. To accomplish the successive stage and periodic operation of the apparatus, a timer 28 is included in the lifter drive motor energy circuit, and pickup wheels 17 are used in the drive circuit of the cooling bed mechanism. The motors 5 turn continuously, without cycling. Preferably, the timer 28 is set to energize the motor 12 to drive the lifters first in succession after the deflecting levers have been energized. The timer is of the automatic resetting type and is adapted to regularly, periodically rotate the lifters through an arc of 180° once each cycle.

The pick-up wheels 17 are adapted to turn in synchronism with one another. Notches 27 therearound must always present a straight and true receiving track for a length of mill stock rolling down along the discharge skids 3. Each and every notch is sufficiently large to provide for relatively loose fit of a length to be received therein. Pick-up wheel feelers 31 are so mounted with relation to the notches that rolled mill stock presses against these feelers as it drops into the notches from the discharge skids 3 and remains resting against the feelers to close the drive circuit from the motors and transmissions 19. It maintains the drive circuit closed just long enough, due to the motion of the wheels, to permit the said motors and transmissions to rotate the wheels and length therein one notch ahead, leaving an empty set of notches adjacent the discharge skids 3. The length of mill stock, by that time, has rolleed away within its containing notches far enough to have become disengaged from the feelers whereupon the drive circuit is opened.

The operation of the entire apparatus will be explained in combination with description of means known in part, as follows:

Rolled mill stock emerges, for example, from a tube reducing mill and is severed into lengths 13a', 13a, and 13 respectively, by cutter 21. In succession these lengths are first taken over by supply roller conveyor 1. After one complete cycle, the lengths are separate, i.e., in approximately those positions represented in FIG. 1 as explained below.

The roller conveyor motors 5 drive the supply conveyor rollers 6 at a rate of speed somewhat greater than the rate of speed with which mill stock emerges from the mill. This creates a gap between the trailing end of each cut length of mill stock, and the leading end of the next following length of stock. It is this gap which causes the light barrier 20 to energize the pump 23 that in turn actuates the deflecting levers. As was stated above, all the roller conveyor motors 5 continuously rotate the rollers to which they are attached, thus always longitudinally advancing any mill stock thereon. In a somewhat similar manner, but with the timer 28 to provide cycling, the motor 12 rotates the lifters on a continuous, periodic basis, thus at all times transferring mill stock lengths thereon.

By following a particular length through the apparatus, the reader will readily come to understand the operation of the apparatus. As the first length 13a advanced longitudinally along the supply roller conveyor 1, the deflecting levers 7 and rollers 6 of the conveyor combined to gently but firmly urge the length laterally across the conveyor and thus out of the mill run-out line. This was a gradual movement and the length was not subjected to any sudden shock. That length thereafter crossed over onto the delivery roller conveyor 2, and was received by the powered rollers 14 thereof. It was received on the sloping channel 9 as it moved laterally and upwardly with the direction of the slope, as well as longitudinally along the slope. As the trailing end of the length passed by the last deflecting lever 7 on the supply roller conveyor the upward slope of the run-on channel and the restriction of the guideway began to overcome the inertia of the length which thus started to roll down the slope. As it rolled down the same it passed over inclined surfaces 26 of lifters 10 which surfaces closely match that of the channel except that they protrude slightly therethrough. Roller run-on cones 14a, the guideway, and lifter roll-along surfaces 10a all served to arrest the lateral movement of the length once it passed over the inclined surfaces of the lifters. The length was then in the position shown dotted at the left in FIG. 1. It is to be noted that the lifter roll-along surfaces 10a provide braking effect only when the lifters are idle. During rotation thereof the said surfaces act as roll-along surfaces for mill stock lengths. The length 13a' preceded length 13a which preceded the length 13 in position on the transfer apparatus, as mentioned, and as shown in FIG. 1. FIG. 3 represents the apparatus one lifter cycle beyond that of FIG. 1; namely, after it has transferred length 13a to the discharge skids, and is arresting the lateral roll of the next length 13 as it comes down across the channel 9. Were a length of mill stock subsequent to length 13 being transferred, this would appear approximately as shown in FIG. 3 by the dotted circle on the channel, and the reference numeral 29.

Each length was rotated up and over, through approximately 180° by the lifters 10, during the course of which rotation the length rolled laterally on its own axis across the lifter roll-along surfaces 10a. As it reached the end of said surfaces it came up against lifter end stops 10c which aligned it longitudinally and brought it to rest both laterally and longitudinally. As the lifters continued to rotate, the end stops passed down between the discharge skids which picked the length off from the lifters. The length immediately rolled into notches 27 of the notched pick-up wheels 17, energizing motors 18 and transmissions 19 by contact with the feelers and thus caused the pick-up wheels to advance. As the length rolled within the notches during the advance, the drive circuit was opened and the pick-up wheels came to rest with empty notches adjoining the discharge skids.

Due to the lifter run-on slants 10d and the lifter convex surfaces 10b even if two successive lengths of mill stock came rolling laterally across the channel 9 or were being transported longitudinally onward closely together, the length which was trailing would be barred from entering the lifter roll-along surfaces occupied by the length which was leading. These two mentioned elements, plus the 180° rotation cycle of the lifters, and the guide-way 9a' all combine to ensure that just one length will at any time be contained in a particular row of lifter roll-along surfaces 10a. This arrangement of the apparatus plays a major role in providing the gentle handling of the mill stock.

The continuous 180° rotation cycles of the lifters occur with pauses therebetween that permit loading of the lifters as a length rolls down and onto same from the channel 9. The automatic resetting timer 28 controls the cycling and the pauses. Whether or not a length of mill stock rests against the lifter convex surfaces 10b this cyclical rotation continues. As the lengths are picked up and over, successively, by the lifters, each of them is deposited, in turn, upon the discharge skids to roll into an empty row of notches 27, cause the pick-up wheels to rotate, and then to cause them to stop, in the manner above described.

Because supply conveyor rollers 6 and delivery conveyor rollers 14 turn constantly, without pause, whenever any length of mill stock reaches approximately the location of the supply conveyor it will begin the transfer journey to the cooling bed, quite irrespective to the positions of the lifters and/or the notched pick-up wheels. In other words, if feeding of lengths to the rollers 6 occurs, the entire sequence of transfer operations will follow for each length fed to the rollers 6, no matter how the feeding occurs. Doubling up will rarely occur. It cannot occur in the lifters, nor in the cooling bed notched pick-up wheels.

Lengths of mill stock are gently handled all along the transfer route. Deflecting levers 7 and rollers 6 cause the length to be urged, not forcibly or suddenly knocked out of the mill run-out line. As the length passes over onto the delivery roller conveyor any lateral momentum it may have acquired is safely neutralized by the combination of guideway 9a and sloping channel 9. As the length rolls down the slope of the channel it picks up momentum, but the roll is short, and the lifter roll-along surfaces 10a, the roller run-on cones 14a and the guideway 9 serve to safely stop the lateral motion. As a length rolls across the lifters it again picks up momentum. But this also is a short traverse, and end stops 10c quickly and safely check its motion. The discharge skids are designed short so as to ensure quick transfer of the length into the notches 27. Little momentum can build up during the transfer. The length is gently handled throughout the entire process. Its lateral motions are all short, and each such is stopped before the next occurs. These periodic cessations of lateral motion also materially assist in the achieving of final and complete deceleration of the length as respects its longitudinal motion.

With the equipment described coordinated, rhythmic and start-stop operation for transfer of lengths of mill stock has been achieved. What is more, this transfer is gentle, swift and certain to the extent that the hot rolled mill stock arrives on the cooling bed undamaged.

Use of the photo-electric cell or light barrier 20 helps to render the apparatus basically flexible enough to handle uneven lengths of rolled mill stock.

It is understood that the preferred and alternative embodiments of this invention, as described above and in the claims that follow, are not intended to limit the scope of this invention thereto. Modifications not here suggested which may occur to those normally skilled in the art are also considered to be within the ambit of the invention.

What is claimed is:
1. Apparatus to transfer rolled mill stock to a cooling bed comprising a source of energy,
   a supply conveyor energized by the source of energy and adapted to transport rolled mill stock away from a mill, and
   a bed to cool said stock, in combination with apparatus to deflect rolled mill stock out of the mill run-out line as it moves along the supply conveyor,
   means connecting the source of energy to the deflecting apparatus,
   a delivery conveyor to receive rolled mill stock from the supply conveyor,
   drive means connecting the source of energy to the delivery conveyor, and
   transfer devices associated with the delivery conveyor to remove rolled mill therefrom and to transfer the stock to said cooling bed.

2. Apparatus according to claim 1
   in which the deflecting apparatus comprises a plurality of levers adapted to laterally deflect mill stock inclinedly upward as it moves longitudinally onward along the supply conveyor,
   a guideway on the delivery conveyor to arrest the lateral movement of mill stock as it is received from the supply conveyor,
   a sloping run-on channel on the delivery conveyor across which mill stock is adapted to roll from the guideway,
   rollers in the delivery conveyor to convey will stock longitudinally onward as it simultaneously rolls across the said conveyor run-on channel,
   powered rotatable lifters as part of the transfer devices, mounted at the lower side of the delivery conveyor sloping run-on channel, and
   roll-along surfaces on the lifters, which said surfaces are so disposed when the lifters are idle as to assist in arresting lateral motion of mill stock after it rolls across the run-on channel.

3. Apparatus according to claim 2
   in which the deflecting levers are adapted to pivot toward longitudinally moving mill stock, successively, one after another,
   in which the lifters include run-on slants to assist in guiding mill stock onto the lifters,
   inclined surfaces as integral portions of the lifters which surfaces match the slope of the run-on channel and guide mill stock onto the lifters,
   roll-along surfaces as part of the lifters across which mill stock rolls during rotation of the lifters,
   and end stops on the lifters which arrest lateral and longitudinal motions of mill stock rolling across the roll-along lifter surfaces and align said mill stock for release to the cooling means.

4. Apparatus according to claim 3
   in which the apparatus further includes discharge skids disposed to receive successive lengths of mill stock from the lifters as the end stops thereof dip between the discharge skids during rotation of the lifters,
   and in which the cooling bed has notched pick-up wheels which receive a length of mill stock as it moves along the discharge skids,
   which said wheels then advance the length of mill stock away from the discharge skids to present a clear receiving track for a subsequent length of mill stock.

5. Apparatus according to claim 4
   in which the supply and delivery conveyors are roller conveyors, said supply conveyor moving the stock faster than the same is discharged from the mill,
   the inclined lifter surfaces are so disposed with relation to the run-on channel of the delivery roller conveyor that the rollers of the said conveyor transport successive lengths of mill stock longitudinally onward in a substantially uniform plane as the lengths roll laterally across the delivery roller conveyor,
   and the notched pick-up wheels are adapted to bring each length of mill stock laterally to rest before advancing the same away from the discharge skids, in combination with
   control means to operate the deflecting levers, the lifters and the cooling bed apparatus periodically, to move one length of mill stock in succession after another,
   there being a light barrier in said control means to sense the passing of space between two lengths.

6. Apparatus according to claim 5
   in which the profile of at least one of the supply conveyor rollers changes from conical shape to cylindrical shape as such roller is viewed from its center out along the length of the roller, drive motors connecting the supply and delivery conveyor rollers with the energy source to drive the said rollers constantly and separately from the apparatus subsequent thereto.

7. Apparatus according to claim 6
in which the delivery conveyor rollers are so disposed that their longitudinal axes precisely match the slope of the run-on channel,
in which there is a run-on cone on the lower end of each said roller, which cones assist in arresting the lateral rolling motion of mill stock coming across the run-on channel,
in which the control means include a timer to periodically effect 180° of rotation of the lifters,
a lifter drive motor to operate the lifters, and
electrical circuits connecting the timer, the energy source and the lifter drive motor to actuate said lifters upon signal from the timer.

8. Apparatus according to claim 7
in which the control means also include cooling bed drive means and electrical circuits connecting the energy source, the cooling bed drive means and the pick-up wheels of the cooling bed,
and pick-up wheel feelers so associated with each pick-up wheel notch as to close the circuit between the energy source and the cooling bed drive means and cause advance of the pick-up wheels upon receipt therein of a length of mill stock, which advance ceases as the said circuit is opened when the received length of mill stock rolls within its supporting notches away from the pick-up wheel feelers.

9. Apparatus to transfer elongated and severed lengths of rolled mill stock to a cooling bed comprising
a conventional cutter to sever rolled stock,
a source of electrical energy,
a fluid supply,
an hydraulic pump connected to the energy source and to the fluid supply,
and a sloping supply roller conveyor attached to the energy source to move rolled mill stock longitudinally from a mill, in combination with
deflecting levers in the supply roller conveyor adapted to pivot in unison and urge mill stock moving along said conveyor laterally out of the mill run-out line and inclinedly upward,
fluid power cylinders operatively connecting the deflecting levers with the energy source, the hydraulic pump and the fluid supply,
rollers in the supply conveyor whose profiles change from conical to cylindrical along their length, viewed from their centers,
motors driving the said rollers individually and constantly at a higher speed than that of the emergence of rolled stock lengths from the mill, thus generating gaps between successive lengths of mill stock as the lengths are conveyed along the supply roller conveyor,
a guideway on the supply roller conveyor adjacent the roller drive motors to guide lengths of mill stock,
a photo-electric cell near the first of said rollers and connected to the energy source and the hydraulic pump so as to detect each gap and cause the deflecting levers to be actuated,
a delivery roller conveyor having a sloping run-on channel matching that of the supply roller conveyor and extending from the supply roller conveyor to receive lengths of mill stock, successively, therefrom,
a sideboard at the top of the sloping run-on channel to assist in checking lateral motion of each length of mill stock coming onto the delivery roller conveyor,
rollers in the delivery roller conveyor inclined to match the slope of the run-on channel and convey lengths of mill stock longitudinally onward while said lengths roll laterally across the delivery roller conveyor run-on channel,
motors connected to the energy source to individually and constantly drive the delivery conveyor rollers,
rotatable lifters at the low side of the sloping run-on channel, and inclined surfaces on said lifters protruding through the sloping run-on channel, guiding each length of mill stock from the said run-on channel onto the lifters while said length is conveyed longitudinally onward in a substantially uniform plane, in combination with
slanted run-on surfaces on the lifters to further guide mill stock lengths onto the lifters,
an upstanding guideway adjacent the lifters to check lateral motion of a length of mill stock as it enters the lifters,
roll-along surfaces on the lifters to assist first in checking lateral motion of a length of mill stock as the same comes across the run-on channel, and then to further laterally advance the length when the lifters rotate,
convex surfaces on the lifters to ensure separate and single-length loading of the lifters,
run-on cones on the delivery conveyor rollers to check lateral motion of lengths of mill stock entering the lifters,
a lifter drive motor driven by the energy source,
an automatic resetting timer installed between the lifter drive motor and the energy source to actuate the lifters through periodic, regular and precise 180° cycles of rotation,
a lifter drive transmission through which the lifter drive motor operates the lifters,
end stops on the lifters to arrest lateral motion of each length of mill stock after it rolls across the lifter roll along surfaces, to align said length, and to arrest its longitudinal motion,
short discharge skids so disposed as to receive lengths of mill stock discharged past the lifter end stops during rotation of the lifters between the said skids,
a cooling bed including notched pick-up wheels to receive lengths of mill stock rolling down the discharge skids,
cooling bed drive motors wired to the energy source,
transmissions through which the cooling bed drive motors drive the notched pick-up wheels,
transport chains and drive shafts connecting the said pick-up wheels to the cooling bed drive motors through the transmissions therefor,
drive circuits connecting the cooling bed drive motors and the energy source,
pick-up wheel feelers so associated with the pick-up wheel notches and the cooling bed drive circuits as to close these drive circuits and maintain them closed upon receipt of a length of mill stock therein just long enough to have the said wheels advance the space of one notch to present a clear receiving track for a subsequent length of mill stock;
whereby successive lengths of elongated rolled mill stock coming from a mill are each individually cycled gently and swiftly out of the mill run-out line onto a cooling bed undamaged.

References Cited by the Examiner
UNITED STATES PATENTS 2,873,840   2/1959   Kerr _____ 198—127
2,880,844   4/1959   Vogeli _____ 198—127

EVON C. BLUNK, *Primary Examiner.*

RICHARD E. AEGERTER, SAMUEL F. COLEMAN,
*Examiners.*